US012072795B1

(12) United States Patent
Zinger et al.

(10) Patent No.: US 12,072,795 B1
(45) Date of Patent: Aug. 27, 2024

(54) PROVIDING ACCESS TO A NAMESPACE VIA MULTIPLE STORAGE ARRAYS

(71) Applicant: Dell Products L.P., Round Rock, TX (US)

(72) Inventors: Eldad Zinger, Raanana (IL); Dmitry Nikolayevich Tylik, Westborough, MA (US); Marina Shem Tov, Hod Hasharon (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/121,111

(22) Filed: Mar. 14, 2023

(51) Int. Cl.
*G06F 12/02* (2006.01)

(52) U.S. Cl.
CPC ................ *G06F 12/0238* (2013.01)

(58) Field of Classification Search
CPC .................................................. G06F 12/0238
See application file for complete search history.

(56) References Cited

U.S. PATENT DOCUMENTS

| | | | |
|---|---|---|---|
| 10,956,346 B1 | 3/2021 | Ben-Yehuda et al. | |
| 11,435,955 B1 * | 9/2022 | Venkatanarayanan | ...................... G06F 3/061 |
| 2019/0294565 A1 | 9/2019 | Pinto et al. | |
| 2021/0049116 A1 * | 2/2021 | Ramesh | ................ G06F 3/0604 |
| 2021/0397351 A1 | 12/2021 | Dhatchinamoorthy et al. | |
| 2021/0397374 A1 | 12/2021 | Agarwal | |
| 2021/0397448 A1 * | 12/2021 | Ramesh | .................. G06F 9/223 |
| 2021/0405915 A1 | 12/2021 | Agarwal | |
| 2022/0222105 A1 | 7/2022 | Sedayao et al. | |
| 2022/0229591 A1 | 7/2022 | Tylik et al. | |
| 2022/0231905 A1 | 7/2022 | Dhatchinamoorthy et al. | |
| 2023/0315586 A1 | 10/2023 | Desai et al. | |
| 2023/0385154 A1 | 11/2023 | Karr | |

* cited by examiner

*Primary Examiner* — Aracelis Ruiz
(74) *Attorney, Agent, or Firm* — BainwoodHuang (57) ABSTRACT

A technique of providing access to a namespace via multiple storage arrays involves providing access to the namespace from a nonvolatile memory (NVM) subsystem while the NVM subsystem is hosted on a first storage array. The technique further involves, after providing access to the namespace from the NVM subsystem while the NVM subsystem is hosted on the first storage array, performing a stretch operation to concurrently host the NVM subsystem on the first storage array and a second storage array. The technique further involves, after performing the stretch operation, providing access to the namespace from the NVM subsystem while the NVM subsystem is concurrently hosted on the first storage array and the second storage array. Accordingly, the namespace is now accessibly via either storage array.

17 Claims, 5 Drawing Sheets

PROVIDING ACCESS TO A NAMESPACE VIA MULTIPLE STORAGE ARRAYS

BACKGROUND

Conventional data storage systems include storage processors and storage drives. During operation, the storage processors store data into the storage drives and load data from the storage drives on behalf of host computers.

One communications protocol used by some data storage systems is the Small Computer System Interface (SCSI) protocol. Another communications protocol used by some data storage systems is nonvolatile memory express (NVMe).

SUMMARY

Some conventional data storage systems include two data storage arrays. The two data storage arrays may maintain respective copies of a volume, and expose the same SCSI identity and parameters so that the host computers view those copies as the same logical unit (LU). Such a situation may involve maintaining all aspects of the SCSI protocol identical to those for a LU hosted by a single data storage array.

Unfortunately, the same approach does not work well for nonvolatile memory express over fabrics (NVMe-oF). Along these lines, the data storage arrays of conventional data storage systems host their own nonvolatile memory (NVM) subsystems, and one foundational NVMe property is that each NVMe namespace is confined to just one NVM subsystem. Accordingly, the same namespace cannot be exposed from two different NVM subsystems hosted on two different data storage arrays at the same time.

One approach to addressing this deficiency is via NVMe Technical Proposal 4034 "Dispersed Namespaces", the contents and teachings of which are hereby incorporated by reference in their entirety. However, this approach requires that the host operating system provide support for Technical Proposal 4034 "Dispersed Namespaces", and certain prominent operating system vendors either have not announced plans to support Technical Proposal 4034 "Dispersed Namespaces", or may have even announced opposition to providing support for Technical Proposal 4034 "Dispersed Namespaces". Moreover, those operating system vendors have not offered any specific alternative.

In contrast to the above-described conventional data storage systems, improved techniques are directed to providing access to a namespace via multiple storage arrays. Such techniques involve hosting an NVM subsystem on multiple storage arrays. When the NVM subsystem is hosted on (or "stretched" onto/over) the multiple storage arrays, a namespace within the NVM subsystem may be presented (or exposed) as a metro volume. That is, access to the namespace may be obtained via any one of the storage arrays. Such ability to access the namespace via multiple storage arrays provides flexibility and convenience, e.g., increased availability and disaster avoidance, the opportunity for resource balancing across datacenters, storage migration, and so on.

One embodiment is directed to a method of providing access to a namespace via multiple storage arrays. The method includes providing access to the namespace from a nonvolatile memory (NVM) subsystem while the NVM subsystem is hosted on a first storage array. The method further includes, after providing access to the namespace from the NVM subsystem while the NVM subsystem is hosted on the first storage array, performing a stretch operation to concurrently host the NVM subsystem on the first storage array and a second storage array. The method further includes, after performing the stretch operation, providing access to the namespace from the NVM subsystem while the NVM subsystem is concurrently hosted on the first storage array and the second storage array. Accordingly, the namespace is now accessibly via either storage array.

Another embodiment is directed to data storage equipment (or storage assembly) which includes a first storage array and a second storage array. The first and second storage arrays are constructed and arranged to perform a method of:

(A) providing access to a namespace from a nonvolatile memory (NVM) subsystem while the NVM subsystem is hosted on the first storage array, (B) after providing access to the namespace from the NVM subsystem while the NVM subsystem is hosted on the first storage array, performing a stretch operation to concurrently host the NVM subsystem on the first storage array and the second storage array, and (C) after performing the stretch operation, providing access to the namespace from the NVM subsystem while the NVM subsystem is concurrently hosted on the first storage array and the second storage array.

Yet another embodiment is directed to a computer program product having a non-transitory computer readable medium which stores a set of instructions to provide access to a namespace via multiple storage arrays. The set of instructions, when carried out by computerized circuitry, causes the computerized circuitry to perform a method of:

(A) providing access to the namespace from a nonvolatile memory (NVM) subsystem while the NVM subsystem is hosted on a first storage array;

(B) after providing access to the namespace from the NVM subsystem while the NVM subsystem is hosted on the first storage array, performing a stretch operation to concurrently host the NVM subsystem on the first storage array and a second storage array; and (C) after performing the stretch operation, providing access to the namespace from the NVM subsystem while the NVM subsystem is concurrently hosted on the first storage array and the second storage array.

In some arrangements, prior to performing the stretch operation, the namespace includes a first volume within first storage of the first storage array. Additionally, performing the stretch operation includes:

(i) creating a second volume within second storage of the second storage array, and (ii) synchronizing data from the first volume within the first storage of the first storage array to the second volume within the second storage of the second storage array.

In some arrangements, the method further includes, after performing the stretch operation, updating log page information to indicate that the NVM subsystem is concurrently hosted on the first storage array and the second storage array and providing asynchronous event notification to a set of hosts indicating that the log page information has changed.

In some arrangements, prior to performing the stretch operation, a first input/output (IO) controller resides on the first storage array to provide the set of hosts with access to the NVM subsystem via the first storage array. Additionally, the method further includes, after performing the stretch operation, creating a second IO controller on the second storage array to provide the set of hosts with access to the NVM subsystem via the second storage array.

In some arrangements, providing access to the namespace from the NVM subsystem while the NVM subsystem is concurrently hosted on the first storage array and the second storage array includes reporting availability of the namespace to the set of hosts via the second IO controller created on the second storage array.

In some arrangements, providing access to the namespace from the NVM subsystem while the NVM subsystem is concurrently hosted on the first storage array and the second storage array further includes:

(i) accessing the namespace in response to first IO commands via the first IO controller on the first storage array, and (ii) accessing the namespace in response to second IO commands via the second IO controller on the second storage array.

In some arrangements, the method further includes providing log page information to the set of hosts in response to a set of discovery commands from the set of hosts.

In some arrangements, providing the log page information includes, prior to performing the stretch operation, providing pre-stretch discovery log page information from the first storage array to a set of hosts, the pre-stretch discovery log page information from the first storage array listing the NVM subsystem as being accessible only through a first set of ports of the first storage array.

In some arrangements, providing the log page information further includes, after performing the stretch operation, providing post-stretch discovery log page information from the first storage array to the set of hosts, the post-stretch discovery log page information from the first storage array listing the NVM subsystem as being accessible through the first set of ports of the first storage array and through a second set of ports of the second storage array.

In some arrangements, providing the log page information includes, prior to performing the stretch operation, providing pre-stretch discovery log page information from the first storage array to a set of hosts, the pre-stretch discovery log page information from the first storage array listing the NVM subsystem as being accessible only through a first set of ports of the first storage array.

In some arrangements, providing the log page information further includes, after performing the stretch operation, providing post-stretch discovery log page information from the first storage array to the set of hosts, the post-stretch discovery log page information from the first storage array listing the NVM subsystem as being accessible through the first set of ports of the first storage array and through a second set of ports of the second storage array.

In some arrangements, providing access to the namespace from the NVM subsystem while the NVM subsystem is concurrently hosted on the first storage array and the second storage array includes maintaining synchronization between the first volume and the second volume.

In some arrangements, the method further includes:

(i) indicating, on a management interface, that the namespace is a volume that has a "local" state in which the namespace is exposed to a set of hosts from only one storage array, and (ii) receiving, from the management interface, a configuration command to transition the volume from the "local" state to a "metro" state in which the namespace is then exposed to the set of hosts from multiple storage arrays, the stretch operation being initiated in response to the configuration command.

In some arrangements, the method further includes, after performing the stretch operation, updating asymmetric namespace access (ANA) log page information to indicate that the namespace is no longer a member of a first ANA group for "local" state volumes and now a member of a second ANA group for "metro" state volumes.

In some arrangements, the method further includes, after providing access to the namespace from the NVM subsystem while the NVM subsystem is hosted on the first storage array and the second storage array, performing a un-stretch operation to no longer host the NVM subsystem on the second storage array.

It should be understood that, in the cloud context, at least some of electronic circuitry (e.g., host devices, fabric componentry, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing access to a namespace via multiple storage arrays.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to providing access to a nonvolatile memory express (NVMe) namespace via multiple storage arrays. Such a technique involves hosting a nonvolatile memory (NVM) subsystem on the multiple storage arrays. Along these lines, when the NVM subsystem is hosted (or "stretched") on the multiple storage arrays, a namespace within the NVM subsystem may be presented (or exposed) as a metro volume rather than a local volume that is locally accessible via only one storage array. That is, nonvolatile memory express over fabrics (NVMe-oF) access to the namespace is available via any one of the storage arrays. Such ability to access the namespace via multiple storage arrays provides flexibility and convenience, e.g., increased availability and disaster avoidance, resource balancing across datacenters, storage migration, and so on.

Figure 1:
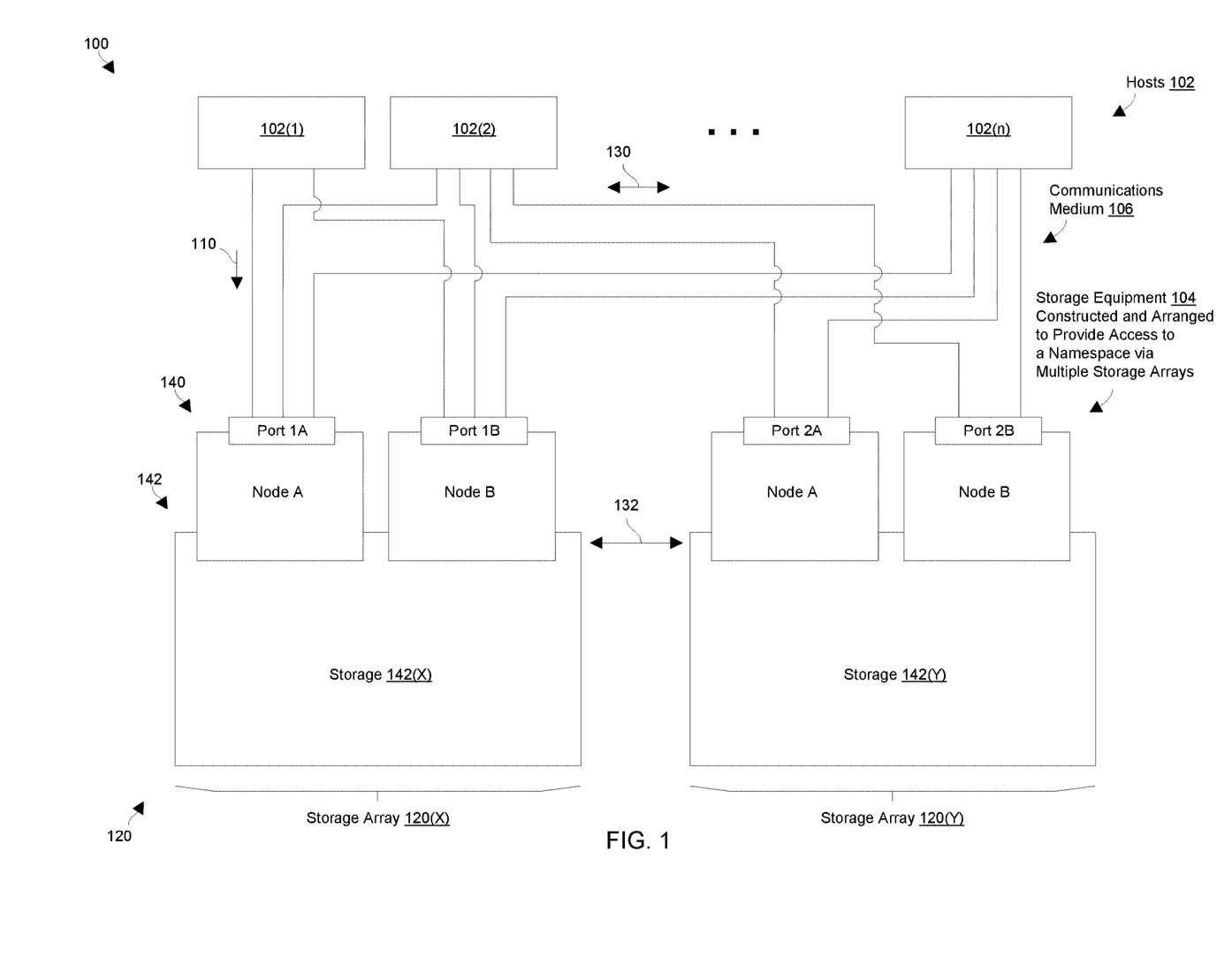
FIG. 1 is a block diagram of a storage environment which provides access to a namespace via multiple storage arrays in accordance with certain embodiments.

FIG. 1 shows a storage environment 100 which provides NVMe-oF access to a NVMe namespace via multiple storage arrays in accordance with certain embodiments. The storage environment 100 includes host computers 102(1), 102(2), . . . , 102(n) (collectively, host computers 102), storage equipment 104, and a communications medium 106.

Each host computer (or simply host) 102 is constructed and arranged to perform useful work. For example, one or more of the host computers 102 may operate as a file server, a web server, an email server, an enterprise server, a database server, a transaction server, combinations thereof, etc. which provides NVMe and other commands 110 to the storage equipment 104. Along these lines, the host computers 102 may provide a variety of different commands 110 (e.g., input/output (IO) requests, discovery commands, identify commands, combinations thereof, and so on) that direct the storage equipment 104 to store data within and retrieve data from storage (e.g., primary storage or main memory, secondary storage, tiered storage, combinations thereof, etc.), provide status (e.g., log page information), create/modify volumes and/or other storage objects/constructs (e.g., NVM subsystems, NVMe namespaces, IO controllers, discovery controllers, etc.), combinations thereof, and so on.

The storage equipment 104 includes multiple storage arrays 120 (i.e., at least two storage arrays 120), and is constructed and arranged to manage data on behalf of the host computers 102. It should be understood that the storage arrays 120 may be located relatively close to each other (e.g., in two server rooms within the same data center), located remotely from each other (e.g., in different data centers, in different campuses, or in different cities), etc. As will be explained in further detail shortly, the storage equipment 104 is able to provide access to a NVMe namespace hosted by any of the multiple storage arrays 120, i.e., a namespace within an NVM subsystem that is "stretched" onto (or across) the storage arrays 120.

The communications medium (or fabric) 106 is constructed and arranged to connect the various components of the storage environment 100 together to enable these components to exchange electronic signals 130 (e.g., see the double arrow 130). Some of the electronic signals 130 (e.g., for bidirectional writes/I/O mirroring) may even be exchanged through the communications medium 106 between (or among) the storage arrays 120 (e.g., see the double arrow 132).

It should be understood that the communications medium 106 may have a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

It should be understood that the communications medium 106 may not connect each host computer 102 to every storage array 120. By way of example only, the communications medium 106 connects the host computer 102(1) to Port 1A and Port 1B of the storage array 120(X), but does not connect the host computer 102(1) to any of the ports of the storage array 120(Y).

Further details of the storage equipment 104 of FIG. 1 will now be provided. It should be understood that the storage equipment 104 has two storage arrays 120(X), 120(Y) by way of example only. In other arrangements, the storage equipment 104 has more than two storage arrays 120 (e.g., three, four, and so on).

Additionally, as shown in FIG. 1, each storage array 120 has two ports by way of example only. Along these lines, the storage array 120(X) has Port 1A and Port 1B. Similarly, the storage array 120(Y) has Port 2A and Port 2B. Such ports serve as communications interfaces for the storage arrays 120 (e.g., the ports enable the storage arrays 120 to communicate with other devices such as the host computers 102). It should be understood that each storage array 120 may have a different number of ports (e.g., three, four, and so on).

Furthermore, as shown in FIG. 1, each storage array 120 has multiple nodes 140 by way of example only. Along these lines, the storage array 120(X) has Node A and Node B, and likewise the storage array 120(Y) has Node A and Node B. The nodes 140, which may be referred to as physical storage processors or SPs (e.g., engines, data movers, director boards, blades, storage circuitry, etc.), process the commands 110 from the host computers 102 (e.g., read commands, write commands, status requests, configuration commands, etc.). It should be understood that each storage array 120 may have a different number of nodes 140 (e.g., three, four, and so on).

Also, as shown in FIG. 1, each storage array 120 includes respective storage 142. That is, the storage array 120(X) has storage 142(X), and similarly the storage array 120(Y) has storage 142(Y).

The storage 142 of each storage array 120 provides memory space for storing data. Such storage 142 may be formed from a set of dual-ported storage devices (e.g., one or more NVMe drives). In some embodiments, the data is arranged in accordance with one or more data protection schemes (e.g., RAID1, RAID5, RAID6, RAID10, etc.). Additionally, in some embodiments, the storage 142 is tiered and includes different types of storage such as RAM, NVRAM devices, other solid state memory devices, hard disk drives (HDDs), and so on.

During operation, the storage equipment 104 processes the commands 110 from the host computers 102. Along these lines, the storage arrays 120 may manage respective NVM subsystems containing NVMe namespaces which are perceived as volumes by the host computers 120. Those of skill in the art would appreciate that, in contrast to a SCSI logical unit, NVMe namespaces have certain different features, aspects, characteristics, etc. For example, a NVMe namespace may be identified via a unique NVMe identifier (e.g., a NamespaceID or NSID), has a contiguous area of nonvolatile memory that a host can access directly, is provisioned with a unique mapping of the nonvolatile memory to a formatted logical block address (LBA) range, and resides within a NVM subsystem, among other things.

As will be explained in further detail below, in accordance with certain improved embodiments disclosed herein, a NVM subsystem may stretch across multiple storage arrays 120 thus enabling the host computers 102 to access a namespace within the stretched NVM subsystem via any of the storage arrays 120. The underlying details of such a stretching operation may be transparent to the host computers 102 which may view NVMe namespaces simply as volumes. A stretched NVM subsystem has at least one NVMe namespace which is accessible by multiple storage arrays 120. Further details will now be provided with reference to FIGS. 2 and 3.

Figure 2:
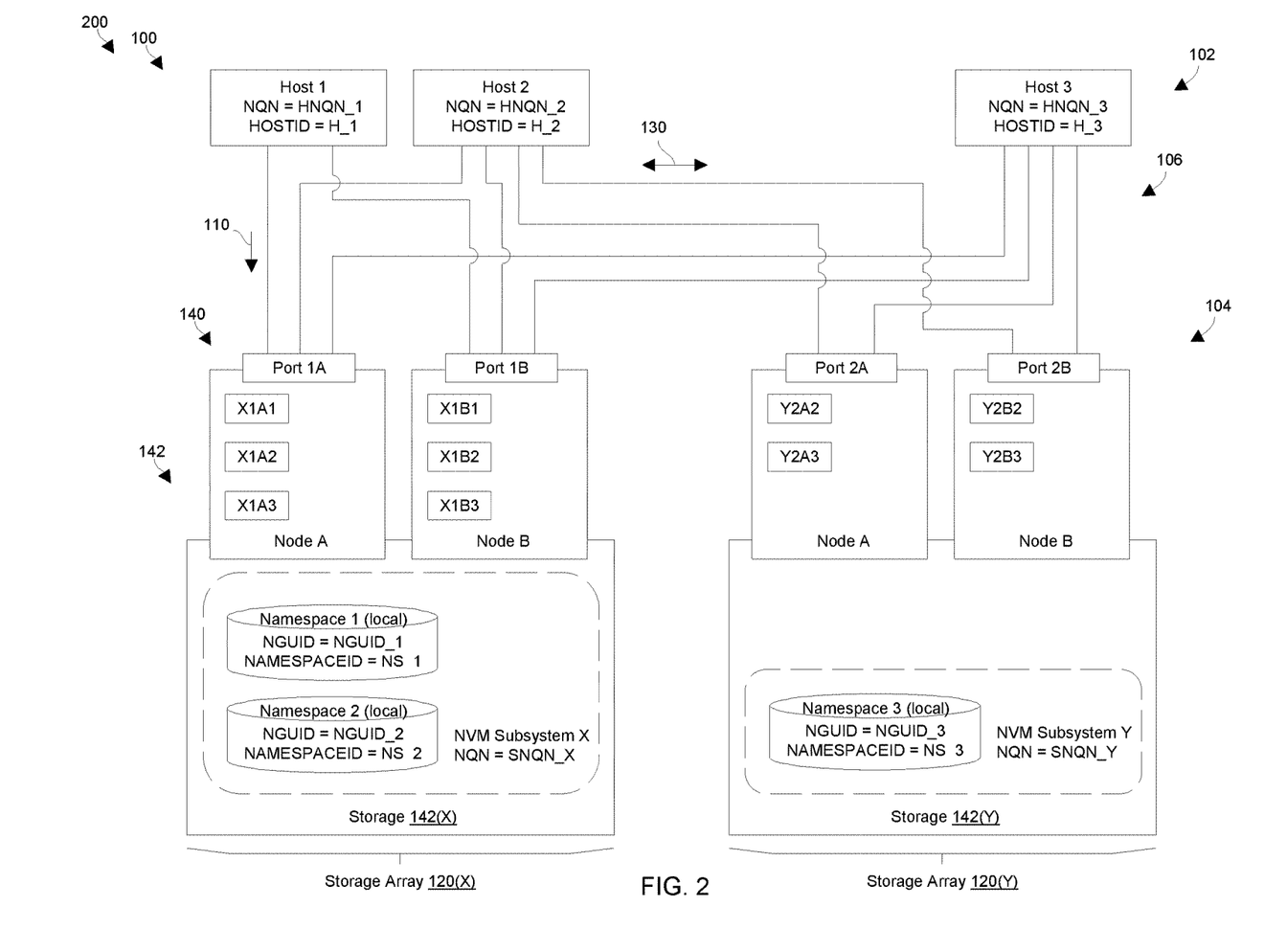
FIG. 2 is a block diagram of the storage environment prior to performing a stretch operation in accordance with certain embodiments.
Figure 3:
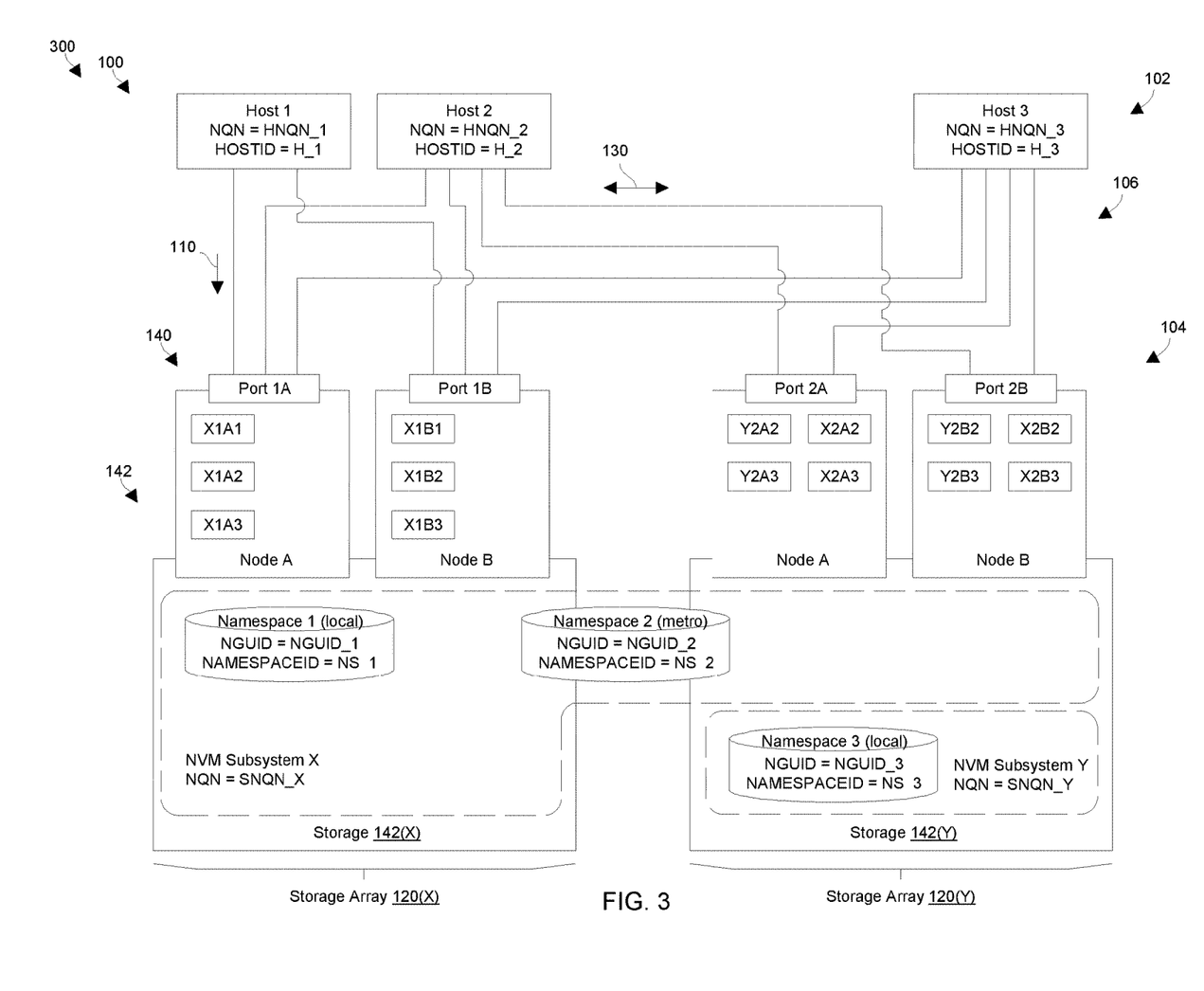
FIG. 3 is a block diagram of the storage environment after performing the stretch operation in accordance with certain embodiments.

FIGS. 2 and 3 show example situations 200, 300 for the storage equipment 104 (also see FIG. 1). FIG. 2 shows, as example situation 200, the storage equipment 104 at a time before performing a NVM subsystem stretching operation. FIG. 3 shows, as example situation 300, the storage equipment 104 at a time after performing the NVM subsystem stretching operation.

With reference to the example situations 200, 300 in FIGS. 2 and 3, there are three host computers 102 by way of example within the storage environment 100. Each host computer 102 is uniquely identified using a NVMe qualified name (NQN) and a host identifier (HOSTID). For example, Host 1 has a host NQN that is "HNQN_1" and a HOSTID that is "H_1". Additionally, Host 2 has a host NQN that is "HNQN_2" and a HOSTID that is "H_2", and Host 3 has a host NQN that is "HNQN 3" and a HOSTID that is "H_3".

Furthermore, as shown in the example situation 200 in FIG. 2, each storage array 120 initially hosts a respective NVM subsystem. Along these lines, the storage array 120(X) hosts NVM subsystem X which is uniquely identified using a storage NQN that is "SNQN_X" (initially shown in FIG. 2 as residing within the storage 142(X) of the storage array 120(X)). Similarly, the storage array 120(Y) hosts NVM subsystem Y which is uniquely identified using a storage NQN that is "SNQN_Y" (shown in FIG. 2 as residing within the storage 142(Y) of the storage array 120(Y)).

By way of example, NVM subsystem X has two NVMe namespaces: Namespace 1 and Namespace 2. Namespace 1 is uniquely identified by a namespace globally unique identifier (NGUID) that is "NGUID_1" and a namespace identifier (NAMESPACEID) that is "NS_1". Namespace 2 is uniquely identified by a NGUID that is "NGUID_2" and a NAMESPACEID that is "NS_2".

Also by way of example, NVM subsystem Y has one NVMe namespace: Namespace 3. Namespace 3 is uniquely identified by a NGUID that is "NGUID_3" and a NAMESPACEID that is "NS_3".

Additionally, the nodes 140 of the storage arrays 120 may run IO controllers, discovery controllers, etc. The IO controllers are constructed and arranged to provide access to the namespaces within the NVM subsystems (e.g., to read and write data). The discovery controllers are constructed and arranged to provide discovery services (e.g., to issue notifications, to report log pages, etc.). Although only IO controllers are shown running on the nodes 140 in FIGS. 2 and 3, it should be understood that other software constructs may run on the nodes 140 as well (e.g., discovery controllers, operating systems, and so on).

In the example situations 200, 300 in FIGS. 2 and 3, each IO controller has one port for a particular host to connect to by way of example only. However, it should be understood that each IO controller may have more than one port.

The NVM subsystems described herein may support a static controller model or a dynamic controller model. Static controllers are pre-created while dynamic controllers are created as hosts connect to ports. In the example situations 200, 300, each dynamic controller is associated with just one port.

To uniquely identify each IO controller in the example situations 200, 300 in FIGS. 2 and 3, a syntax of     [NVM subsystem] [port ID] [host ID]

is used. So, in Node A of the storage array 120(X), there is an IO controller identified as "X1A1" which means that the IO controller is bound to NVM subsystem X and port 1A, and services IO commands from Host 1. Additionally, the IO controller identified as "X1A2" is bound to NVM subsystem X and port 1A, and services IO commands from Host 2. Furthermore, the IO controller identified as "X1A3" is bound to NVM subsystem X and port 1A, and services IO commands from Host 3.

Likewise, in Node B of the storage array 120(X), there is an IO controller identified as "X1B11" which means that the IO controller is bound to NVM subsystem X and port 1B, and services IO commands from Host 1. Additionally, the IO controller identified as "X1B2" is bound to NVM subsystem X and port 1B, and services IO commands from Host 2. Furthermore, the IO controller identified as "X1B3" is bound to NVM subsystem X and port 1B, and services IO commands from Host 3.

Regarding Node A of the storage array 120(Y), there is an IO controller identified as "Y2A2" which means that the IO controller is bound to NVM subsystem Y and port 2A, and services IO commands from Host 2. Additionally, the IO controller identified as "Y2A3" is bound to NVM subsystem Y and port 2A, and services IO commands from Host 3.

Regarding Node B of the storage array 120(Y), there is an IO controller identified as "Y2B2" which means that the IO controller is bound to NVM subsystem Y and port 2B, and services IO commands from Host 2. Additionally, the IO controller identified as "Y2B3" is bound to NVM subsystem Y and port 2B, and services IO commands from Host 3.

It should be understood that the identifiers above are provided by way of example only. Other unique identifiers are suitable for use as well for various identifiers such as Worldwide Name (WWN), MAC address, IP address, TCP port ID, combinations thereof, and so on. Along these lines and in accordance with certain embodiments, the IO controllers that are mentioned above may be referenced using controller IDs, which are 16-bit numbers as defined in NVM specifications.

In the example situations 200, 300 in FIGS. 2 and 3, Host 1 connects through the communications medium 106 with port 1A and port 1B of the storage array 120(X), and does not connect with the storage array 120(Y). Host 2 connects through the communications medium 106 with port 1A and port 1B of the storage array 120(X), and with port 2A and port 2B of the storage array 120(Y). Host 3 connects through the communications medium 106 with port 1A and port 1B of the storage array 120(X), and with port 2A and port 2B of the storage array 120(Y).

Initially, as shown in the example situation 200 in FIG. 2, all of the NVMe namespaces are perceived by the host computers 102 as "local" volumes, i.e., the namespaces are available via only one storage array 120. Along these lines, Host 1, Host 2, and Host 3 are able to access Namespace 1 and Namespace 2 in NVM subsystem X only from the storage array 120(X). Additionally, Host 2 and Host 3 are able to access Namespace 3 in NVM subsystem Y only from the storage array 120(Y).

Now, suppose that the storage equipment 104 operates for a period of time in the example situation 200 shown in FIG. 2. Along these lines, the storage equipment 104 richly and reliably processes commands 110 from the host computers 102 (FIG. 1) to store data into and load data from the various NVMe namespaces which the host computers 102 perceive as standard volumes.

As some point, it may be determined that a NVMe namespace should be made accessible via multiple storage arrays 120. For example, it may be advantageous to make Namespace 2 in NVM subsystem X accessible from the storage array 120(X) and the storage array 120(Y). In such a situation, Namespace 2 would then be perceived as a "metro" volume because Namespace 2 would be accessible by a host computer 102 via more than one storage array 120.

To make Namespace 2 accessible from the storage array 120(X) and from the storage array 120(Y), a user may enter an instruction (or command) into a management interface that controls the storage equipment 104. In particular, on the management interface, Namespace 2 may be initially presented to the user as a volume displayed or rendered as having a current volume state (or label) of "local". The user may then provide a new volume state (or label) of "metro" for Namespace 2 via the management interface (e.g., by changing a dropdown menu tab from "local" to "metro", by selecting "metro" in a dialogue box, etc.). The management interface processes this control input as a configuration command to modify (or reconfigure) operation so that Namespace 2 is now perceived as a metro volume as shown in the example situation 300 in FIG. 3. As a result, Namespace 2 is no longer perceived by external hosts as a "local" volume but instead as a "metro" volume.

It should be understood that the instruction to change the NVMe namespace referred to as Namespace 2 was described above as being provided by a user of the management interface (e.g., an administrator or operator of the storage equipment 104). Other sources for this configuration command are suitable as well. Along these lines, the configuration command may be automatically submitted in response to an internal event (e.g., an internal tuning or optimization decision), a scheduled calendar entry (e.g., a planned migration), an external situation (e.g., a detected change in the fabric/network), and so on.

To make Namespace 2 accessible from both the storage array 120(X) and the storage array 120(Y), the storage equipment 104 performs a stretch operation which stretches NVM subsystem X across the storage arrays 120(X), 120 (Y), as shown in the example situation 300 in FIG. 3. The storage equipment 104 then communicates with the host computers 102 to enable the host computers 102 to perceive Namespace 2 as a metro volume (e.g., via creation of new IO controllers in the nodes of the storage array 120(Y)) in order to access Namespace 2 within the stretched NVM Subsystem X from either storage array 120 if possible. Further details of this process will now be provided with reference to FIG. 4.

Figure 4:
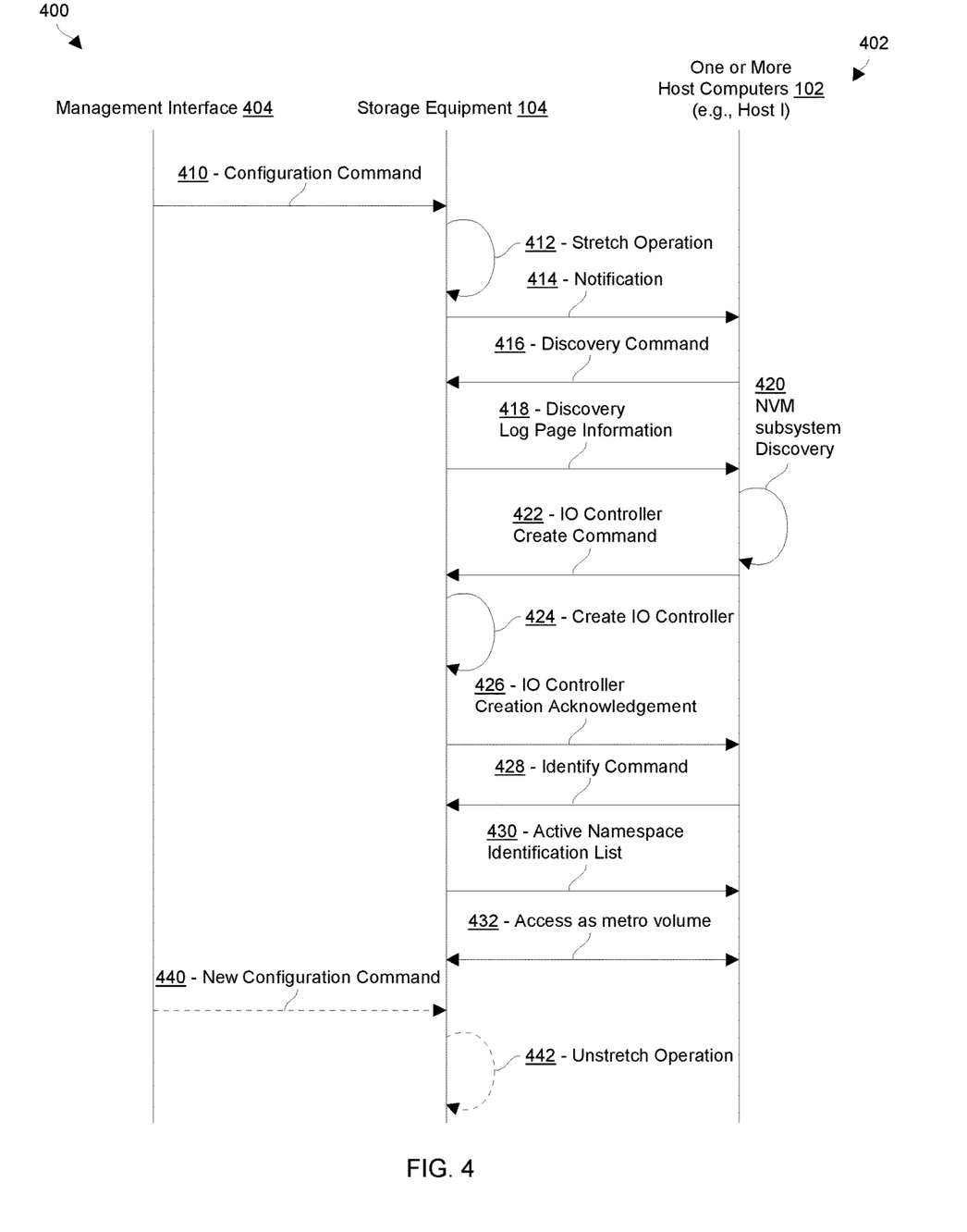
FIG. 4 is a sequence diagram illustrating particular details when providing access to a namespace via multiple storage arrays in accordance with certain embodiments.

FIG. 4 is a sequence diagram 400 that illustrates certain activities 402 among a management interface 404, the storage equipment 104, and a host computer 102 to provide access to a NVMe namespace (e.g., Namespace 2 in FIGS. 2 and 3) via multiple storage arrays 120. As mentioned earlier, the storage equipment 104 presents NVMe namespaces as volumes to the host computers 102 (also see FIG. 1).

At 410, the management interface 404 provides a configuration command to the storage equipment 104. As mentioned earlier, such a command directs the storage equipment 104 to no longer present the namespace as a local volume which is accessible from only one storage array 120 (see Namespace 2 in FIG. 2), but to present the namespace as a metro volume which is accessible from multiple storage arrays 120 (see Namespace 2 in FIG. 3).

It should be understood that the management interface 404 is not restricted in terms of its location within the storage environment 100. In some arrangements, the management interface 404 may run on a device that is adjacent the storage equipment 104 (e.g., a service processor, a nearby laptop or workstation, etc.). In other arrangements, the management interface 404 may be remote from the storage equipment 104 (e.g., an external computer that connects with the storage equipment 104 through a network). Other arrangements are suitable for use as well, e.g., the management interface 404 may be a tool or application that runs on one or more host computers 102, the storage equipment 104 itself, combinations thereof, and so on.

At 412, in response to the configuration command, the storage equipment 104 performs a stretch operation that stretches a NVM subsystem having the namespace across the multiple storage arrays 120 (see NVM subsystem X in FIG. 3). As mentioned earlier, the details of the stretch operation may be transparent to the host computers 102. However, in accordance with certain embodiments, the stretch operation involves creating a new storage object within the storage 142 of the other storage array 120 (e.g., storage 142(Y) of the storage array 120(Y)) and then copying data from the original storage object in the original storage 142 of the original storage array 120 (e.g., storage 142(X) of the storage array 120(X)). Transparently, the data is mirrored between the storage objects although reference to the NVMe namespace itself may continue to be through the namespace and NVM subsystem identifiers (e.g., NGUID, NAMESPACEID, NQN, etc.).

The stretch operation is considered finished once data mirroring is satisfied between the storage objects. Upon completion of the stretch operation, the stretched NVM subsystem is considered hosted by multiple storage arrays 120 of the storage equipment 104 (the NVM subsystem X is hosted by the storage arrays 120(X), 120(Y) in FIG. 3).

At 414, when the stretch operation has completed, the storage equipment 104 outputs a set of notifications. In some arrangements, each storage array 120 of the storage equipment 104 that is affected by (or that experiences a change in response to) the stretch operation provides a notification to every host computer 102 in the storage environment 100. However, it should be understood that this is not a requirement and, in certain situations, less than all of the storage arrays 120 provide notification and/or less than all of the host computers 102 receive notification.

In some arrangements, the notification is an asynchronous event notification (AEN) or similar communication that informs the host computer 102 that there has been a change in the configuration of the storage equipment 104. Such an AEN may be sent from a discovery service (e.g., a discovery controller) of each storage array 120 of the storage equipment 104 that is affected by the stretch operation.

At 416, the host computers 102 that receive the notifications are now informed that a change has occurred in the discovery log page information for the storage array 120 that sent the notifications. Accordingly, the host computers 102 may respond to the notifications by sending back discovery commands requesting the updated/changed discovery log page information.

In some arrangements, the host computers 102 issue discovery log page commands with the log identifiers set to 70h to discovery controllers of the storage arrays 120. Such a command is constructed and arranged to obtain a list of NVMe Qualified Names (SUBNQNs) accessible through the target NVMe port.

By way of example, further sequence diagram details will be provided from the context of Host 2 (also see FIGS. 2 and 3) sending a discovery log page command to the storage equipment 104. Nevertheless, it should be understood that other host computers 102 may be configured to provide a discovery log page command to the storage equipment 104 in response to a notification.

At 418, the storage arrays 120 receiving the discovery commands provide back current log page information in response to the discovery commands. For example, the storage array 120(X) provides back log page information to Host 2 (FIGS. 2 and 3) in response to a discovery log page command from Host 2.

Table I (below) is example discovery log page information that may be provided by the storage array 120(X) in response to a discovery command from a host computer 102. NVM subsystem X is identified as SUBNQN="SNQN_X" in Table I. For example, this discovery log page information may be returned by a discovery controller that receives a discovery command via Port 1A of the storage array 120(X) from Host 2 (also see FIG. 3). Other host computers 102 sending similar discovery commands receive similar discovery log page information.

TABLE I

| | |
|---|---|
| SUBTYPE, byte 02 | 02 (controllers may have attached namespaces) |
| PORTID, bytes 05:04 | Port 1A |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 1B |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 2A |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 2B |
| CNTLID, bytes 07:06 | FFFFh |
| SUBNQN, bytes 511:256 | SNQN_X |

It should be understood that the discovery log page information may include other information such as TRTYPE, ADRFAM, etc. but that such information is omitted from Table I for simplicity.

In Table I, Port 1A and Port 1B are shown because NVM subsystem X continues to be hosted by the other storage array 120(X). Additionally, Port 2A and Port 2B are shown because NVM subsystem X has been stretched across the other storage array 120(Y).

Since the storage array 120(X) is not involved with NVM subsystem Y, the discovery log page information from the storage array 120(X) does not indicate any log page information pertaining to NVM subsystem Y. Rather, this discovery log page information only indicates log page information pertaining only to NVM subsystem X.

At 420, from the discovery log page information, Host 2 determines that NVM subsystem X is now available via the storage array 120(Y). That is, upon receipt of updated discovery log page information by Host 2 from a discovery controller, Host 2 may compare the updated discovery log page information with earlier-received discovery log page information. The Table II (below) is example earlier-received discovery log page information that may have been provided earlier to host computer 102 by the storage array 120(X) (e.g., in response to an earlier discovery command).

TABLE II

| | |
|---|---|
| SUBTYPE, byte 02 | 02 (controllers may have attached namespaces) |
| PORTID, bytes 05:04 | Port 1A |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 1B |

TABLE II-continued

| | |
|---|---|
| CNTLID, bytes 07:06 | FFFFh |
| SUBNQN, bytes 511:256 | SNQN_X |
| SUBTYPE, byte 02 | 02 (controllers may have attached namespaces) |

Again, it should be understood that the discovery log page information may include other information such as TRTYPE, ADRFAM, etc. but that such information is omitted from Table II for simplicity.

In Table II, Port 2A and Port 2B are not shown because NVM subsystem X had not yet been stretched across the other storage array 120(Y). Since in contrast to Table II the updated discovery log page information in Table I indicates that NVM subsystem X is now available via storage array 120(Y), the host computer 102 may further query the storage equipment 104 to determine what NVMe namespaces are in NVM subsystem X.

As mentioned above, similar discovery log page information may be acquired by other host computers 102. For example, if Host I routinely communicates with the storage array 120(X), Host 1 would be receipt of the same discovery log page information as Host 2 (see Tables I and II above).

At 422, Host 2 directs the storage array 120(Y) to create new IO controllers on the nodes of storage array 120(Y) to access NVM subsystem X via the storage array 120(Y). In particular, based on the discovery log page information (see Table I), Host 2 sees that Port 2A and Port 2B of the storage array 120(Y) are available to access the NVM subsystem X. Accordingly, Host 2 creates new IO controllers on the nodes 140 of the storage array 120(Y) to enable those nodes to expose the NVMe namespaces of NVM subsystem X. Similarly, since Host 3 also connects with the storage array 120(Y) (see FIGS. 2 and 3), Host 3 may also direct the nodes 140 of the storage array 120(Y) to create new IO controllers to enable those nodes 140 to expose the NVMe namespaces of NVM subsystem X.

At 424, the storage equipment 104 creates new IO controllers in response to commands from the host computers 102 to create new IO controllers. FIG. 3 shows that Node A of the storage array 120(Y) has created IO controllers "X2A2" and "X2A3", and that Node B of the storage array 120(Y) has created IO controllers "X2B2" and "X2B3". IO controller "X2A2" is bound to NVM subsystem X and port 2A, and services IO commands from Host 2. Additionally, IO controller "X2A3" is bound to NVM subsystem X and port 2A, and services IO commands from Host 3. Furthermore, IO controller "X2B2" is bound to NVM subsystem X and port 2B, and services IO commands from Host 2. Additionally, IO controller "X2B3" is bound to NVM subsystem X and port 2B, and services IO commands from Host 3.

At 426, the storage equipment 104 acknowledges that the IO controllers have been created. In some arrangements, the acknowledgement is a NVMe response message.

It should be understood that, once the IO controllers are created, the host computers 102 may identify (e.g., via identify commands) what NVMe namespaces are available as described above. Along these lines, since NVM subsystem X has been stretched across the storage arrays 120 to enable the host computers 20 to access Namespace 2 as a metro volume from both storage arrays 120, the host computers 102 such as Host 2 and Host 3 are now able to access Namespace 2 via the storage array 120(Y) (also see FIG. 3).

At 428, Host 2 sends an identify command to a newly created IO controller of the storage array 120(Y) requesting an active namespace identification list. For example, the identify command may be sent to the IO controller X2A2 (see FIG. 3). In some arrangements, the command uses the log identifier "02h".

At 430, in response, Host 2 receives an active namespace identification list from newly created IO controller (e.g., X2A2 in FIG. 3). Table V (below) is an example active namespace identification list that is received by Host 2.

TABLE V

| NS_2 |
|---|

Here, Namespace 2 is identified as being accessible from NVM subsystem X via X2A2. Namespace 1 is not identified as being accessible from NVM subsystem X via Port 2A since Namespace 1 was not transitioned from "local" to "metro" (recall that only the storage object for Namespace 2 has been copied/mirrored to the storage array 120(Y)).

For illustration purposes, if Host 2 sends a similar identify command to an IO controller of the storage array 120(X) (e.g., X1A2 in FIG. 3), the following in Table VI would be returned as active namespace identification list.

TABLE VI

| NS_1 |
| NS_2 |

Here, both Namespace 1 and Namespace 2 are identified as being accessible from NVM subsystem X via X1A2 of the storage array 120(X).

At 432, Host 2 is able to access Namespace 2 via the storage array 120(Y). Along these lines, Host 2 is able to write data to and read data from Namespace 2 through Port 2A and Port 2B of the storage array 120(Y).

It should be understood that Host 2 may access Namespace 2 via the storage array 120(Y) indefinitely. For example, Host 2 may consider a path to Port 1B of the storage array 120(X) to be optimized and thus primarily access Namespace 2 via that path. However, Host 2 may further consider another path to Port 2A of the storage array 120(Y) to be non-optimized but indefinitely available and thus access Namespace 2 via the other path if Host 2 loses access to Port 1B of the storage array 120(X).

It should be further understood that, at some point, a decision may be made to un-stretch NVM subsystem X and transition Namespace 2 from being perceived as a "metro" volume back to being perceived as a "local" volume. In particular, it may no longer be desirable to provide access to Namespace 2 from the storage array 120(Y) (e.g., due to repurposing resources on storage array 120(Y), etc.). In such a situation, 440 and 442 are performed (shown in phantom in FIG. 4).

Along these lines, the user may select an option (e.g., a tab, a menu selection, etc.) in the management interface 404 that changes Namespace 2 from being perceived as a "metro" volume back to a "local" volume. In response, at 440, the management interface 404 provides the storage equipment 104 with a new configuration command directing the storage equipment to transparently un-stretch NVM subsystem X.

At 442, the storage equipment 104 performs an un-stretch operation in response to the configuration command. The un-stretch operation returns Namespace 2 and NVM subsystem X to the original situation (also see FIG. 2). Such a process is similar to changing an actual volume (e.g., a volume accessed via SCSI commands) from a metro state to a local state. In some situations, the storage object on the storage array 120(Y) may optionally continue to exist (e.g., unless the space is needed for reuse, etc.).

It should be understood that, in accordance with certain embodiments, the activities 402 of the sequence diagram 400 are carried out in a manner that is transparent to host applications running on the host computers 102. That is, the host applications merely perceive Namespace 2 as a volume, and that the state of the volume has transitioned from "local" (i.e., a volume that is accessible from only one storage array 120) to "metro" (i.e., a volume that is accessible from multiple storage arrays 120).

It should be further understood that, in a manner similar to that for Host 2, one or more other host computers 102 may obtain access to Namespace 2 via multiple storage arrays 120. For example, Table III (below) shows initial discovery log page information that Host 3 receives from Port 2A when requesting discovery log page information while the storage equipment 104 is in the situation 200 of FIG. 2.

TABLE III

| SUBTYPE, byte 02 | 02 (controllers may have attached namespaces) |
|---|---|
| PORTID, bytes 05:04 | Port 2A |
| CNTLID, bytes 07:06 | FFFFh |
| SUBNQN, bytes 511:256 | SNQN_Y |
| SUBTYPE, byte 02 | 02 (controllers may have attached namespaces) |
| PORTID, bytes 05:04 | Port 2B |
| CNTLID, bytes 07:06 | FFFFh |
| SUBNQN, bytes 511:256 | SNQN_Y |

Here, NVM subsystem X is not yet stretched/accessible and thus the discovery log page information from Port 2A does not provide any information for NVM subsystem X, but only for NVM subsystem Y.

However, Table IV (below) shows subsequent discovery log page information that Host 3 receives from Port 2A when requesting discovery log page information while the storage equipment 104 is in the situation 300 of FIG. 3 (also see 416, 418, and 420 in FIG. 4).

TABLE VI

| SUBTYPE, byte 02 | 02 (controllers may have attached namespaces) |
|---|---|
| PORTID, bytes 05:04 | Port 1A |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 1B |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 2A |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 2B |
| CNTLID, bytes 07:06 | FFFFh |
| SUBNQN, bytes 511:256 | SNQN_X |
| SUBTYPE, byte 02 | 02 (controllers may have attached namespaces) |
| PORTID, bytes 05:04 | Port 2A |
| CNTLID, bytes 07:06 | FFFFh |
| SUBNQN, bytes 511:256 | SNQN_Y |
| SUBTYPE, byte 02 | 02 (controllers may have attached namespaces) |
| PORTID, bytes 05:04 | Port 2B |
| CNTLID, bytes 07:06 | FFFFh |
| SUBNQN, bytes 511:256 | SNQN_Y |

Here, the discovery log page information indicates that NVM subsystem X is accessible via Port 1A, Port 1B, Port 2A, and Port 2B. Accordingly, NVM subsystem X is accessible via any of the ports of the storage equipment 104.

At this point, it should be understood that the storage equipment 104 is constructed and arranged to support a variety of asymmetric namespace access (ANA) groups. Table VII (below) is an example listing that is supported by the storage equipment 104 for the situations 200, 300 described above (also see FIGS. 2 through 4). There are 2 ANA groups to expose a namespace with local volume behavior. Additionally, there are 14 ANA groups to expose a namespace with metro volume behavior.

TABLE VII

| | Port 1A | Port 1B | Port 2A | Port 2B | Description |
|---|---|---|---|---|---|
| 1 | O | NO | | | Local on Storage Array 102(X) |
| 2 | NO | O | | | |
| 3 | | | O | NO | Local on Storage Array 102(Y) |
| 4 | | | NO | O | |
| 5 | O | NO | O | NO | Equidistant Host Connectivity |
| 6 | O | NO | NO | O | |
| 7 | NO | O | O | NO | |
| 8 | NO | O | NO | O | |
| 9 | O | NO | NO | NO | Uniform Host Co-Located with Storage Array 102(X) |
| 10 | NO | O | NO | NO | |
| 11 | NO | NO | O | NO | Uniform Host Co-Located with Storage Array 102(Y) |
| 12 | NO | NO | NO | O | |
| 13 | O | NO | I | I | Fractured Metro on Storage Array 102(X) |
| 14 | NO | O | I | I | |
| 15 | I | I | O | NO | Fractured Metro on Storage Array 102(Y) |
| 16 | I | I | NO | O | |

In Table VII, there is the following:
- "O" means ANA optimized on a controller associated with the specified port.
- "NO" means ANA non-optimized on a controller associated with the specified port.
- "I" means ANA inaccessible on a controller associated with the specified port.

Figure 5:
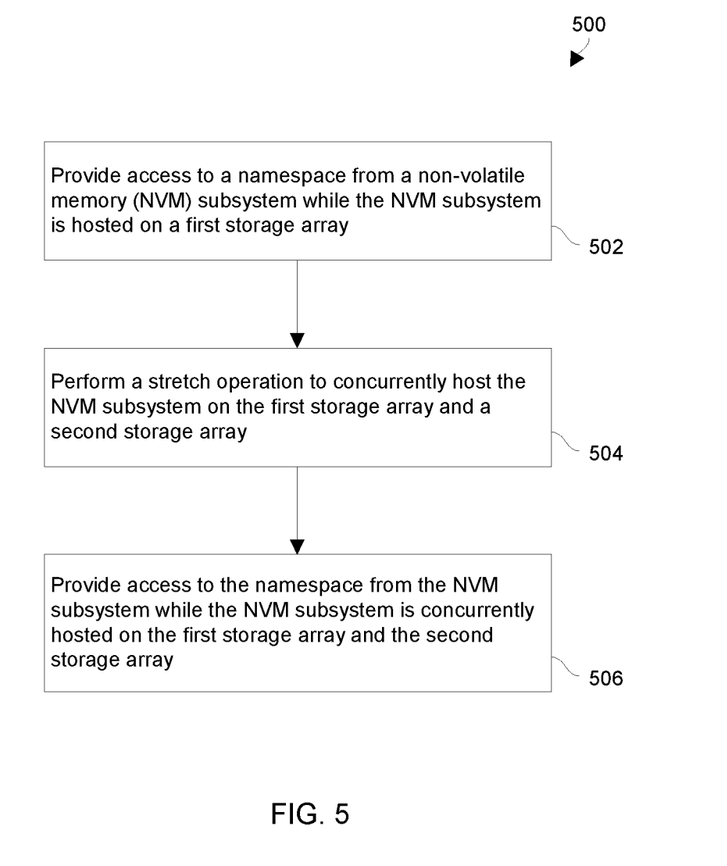
FIG. 5 is a flowchart of a procedure which is performed by storage equipment when providing access to a namespace via multiple storage arrays in accordance with certain embodiments.

Further details will now be provided with reference to FIG. 5.

FIG. 5 is a flowchart of a procedure 500 which is performed by the storage equipment 104 when providing access to a NVMe namespace via multiple storage arrays. Such a procedure 500 may be initiated by a management interface and performed transparently from the perspective of host computers.

At 502, the storage equipment provides access to the namespace from a nonvolatile memory (NVM) subsystem while the NVM subsystem is hosted on a first storage array. An example is illustrated by Namespace 2 of the NVM subsystem X in the situation 200 in FIG. 2.

At 504, the storage equipment, after providing access to the namespace from the NVM subsystem while the NVM subsystem is hosted on the first storage array, performs a stretch operation to concurrently host the NVM subsystem on the first storage array and a second storage array. An example is illustrated by Namespace 2 of the NVM subsystem X in the situation 300 in FIG. 3.

At 506, the storage equipment, after performing the stretch operation, provides access to the namespace from the NVM subsystem while the NVM subsystem is concurrently hosted on the first storage array and the second storage array. An example is illustrated by the IO controllers on the nodes of the storage arrays 120 in FIG. 3 such as X1A2 on Node A of the storage array 120(X) and Y2A2 on Node A of the storage array 120(Y) that provide Host 2 with access to Namespace 2.

As described above, improved techniques are directed to providing access to a namespace via multiple storage arrays 120. Such techniques involve hosting an NVM subsystem on the multiple storage arrays 120. When the NVM subsystem is hosted on (or "stretched" onto/over) the multiple storage arrays 120, a NVMe namespace within the NVM subsystem may be presented (or exposed) as a metro volume. That is, access to the namespace may be obtained via any one of the storage arrays 120. Such ability to access the namespace via multiple storage arrays 120 provides flexibility and convenience, e.g., increased availability and disaster avoidance, resource balancing across datacenters, storage migration, and so on.

One should appreciate that the above-described techniques do not merely gather and store data. Rather, the disclosed techniques involve improvements to data storage technology. Along these lines, NVMe namespaces can be accessed from multiple storage arrays without requiring host operating systems provide support for Technical Proposal 4034 "Dispersed Namespaces", operating system alternatives, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It can be viewed that the industry standard system architecture for SCSI attached hosts (Fibre Channel or iSCSI) is to create two copies of the volume on two storage arrays and expose the same SCSI identity and parameters, so all attached hosts perceive those copies as the same exact Logical Unit (LU). This includes maintaining all aspects of SCSI protocols identical to how an LU hosted by a single storage array would behave.

However, this same approach does not work well for NVMe-oF attached hosts if individual storage arrays in a metro cluster configuration each host their own NVM Subsystem. One of foundational NVMe properties is that each NVM namespace is confined to an NVM subsystem and cannot be exposed out of two NVM subsystems at the same time. Currently, the only way offered by NVMe standards to break this foundational property is "Dispersed Namespace" concept introduced in NVMe Technical Proposal 4034 "Dispersed Namespaces" ratified on 22 Jul. 2021. A dispersed NVM namespace can be hosted by more than one NVM subsystem at the same time as long as:
1. The namespace is identified as a Dispersed Namespace (DISNS bit is set to '1') in Namespace Multi-path I/O and Namespace Sharing Capabilities (NMIC) field of Identify Namespace Data Structure.

2. Two (or more) copies of the namespace are exposed by two (or more) hosting storage arrays with the same NGUID.
3. The host operating system supports TP 4034 "Dispersed Namespaces".

1 and 2 above need to be supported by storage array vendors while 3 needs to be supported by host operating system vendors. However, out of major operating systems vendors only one company currently has Dispersed Namespace support on its roadmap, and other companies have not announced any plans yet. Moreover, it can be argued that the Linux kernel community opposes the Dispersed Namespace concept, and is not offering any specific alternative. Accordingly, a solution is required to support metro storage attachment to NVMe-oF hosts without using Dispersed Namespace for Linux kernel based operating systems and potentially others.

In accordance with certain embodiments, there is provided NVMe-oF Host Support for Metro Storage in absence of Dispersed Namespaces. Along these lines, a metro storage cluster is a storage array deployment in which two storage arrays, typically deployed in two different data centers or two server rooms within the same data center, cooperate to expose a single "metro" volume/volume group to application hosts, making those hosts and applications running on them perceive two volumes/volume groups hosted by the two arrays as a single storage object. Primary metro storage cluster use cases include:

1. Increased availability and disaster avoidance.
2. Resource balancing across datacenters.
3. Storage migration.

In accordance with certain embodiments, storage equipment is able to "stretch" an NVM subsystem any time a volume/volume group hosted by a storage array is configured as a metro storage object with another storage array. Once there are no metro volumes/volume groups across two storage arrays, it is even possible to "un-stretch" previously "stretched" NVM subsystems.

Consider an example with two storage arrays—Array 1 and Array 2, and two NVM subsystems—X (initially hosted on Array 1) and Y (initially hosted on Array 2). Once the volume Namespace 2 is configured as a metro volume, NVM subsystem X is "stretched" to Array 2, so it is now hosted by both storage arrays.

There are several aspects of a "stretched" NVM subsystem that need to be highlighted:

1. Reporting NVM Subsystems and ports from NVM Discovery controllers. (as prescribed by NVM specifications) Both Array 1 and Array 2 host dedicated NVM Discovery Subsystems solely to allow discovery of other NVM Subsystems and ports which hosts can connect to.
2. Reporting local and metro namespaces by controllers associated with Array 1 and 2 ports.
3. Creating ANA Groups to support required asymmetric namespace access configurations.

Discovery Controllers

"Stretching" Subsystem X causes discovery log pages update for both Array 1 and Array 2 discovery subsystems. By stretching subsystem X to Array 2, all Array 2 NVM ports are added to discovery log page for Array 1 discovery subsystem and vice versa. If a connected host creates a persistent discovery controller, upon updates of discovery log page(s), the discovery controller sends a discovery log page change AEN to each host that has requested asynchronous event notifications of this type.

Host 1

Host 1 invokes Get Log Page via a discovery controller associated with either Port 1A or Port 1B as it is only connected to Array 1 which models non-uniform host connectivity in a metro cluster.

Log Identifier 70h, "Discovery" through Port 1A (omitting fields that are not critical, such as TRTYPE, ADRFAM) returns both Array 1 and Array 2 ports as Subsystem X is hosted by both storage arrays. Also, see Table I above.

Host 2

Host 2 invokes Get Log Page via a discovery controller associated with one of Port 1A, Port 1B, Port 2A or Port 2B as it is connected to both Array 1 and Array 2 which models uniform host connectivity in a metro cluster.

Log Identifier 70h, "Discovery" through Port 1A (omitting fields that are not critical, such as TRTYPE, ADRFAM) returns only Subsystem X ports (hosted by both Array arrays though). Also see Table I above.

Log Identifier 70h, "Discovery" through Port 2A (omitting fields that are not critical, such as TRTYPE, ADRFAM) returns both Subsystem X and Subsystem Y. Also see Table VI above.

Namespaces Reporting

Namespace 1 is local to Array 1, so it is only reported to Host 1, Host 2 and Host 3 through NVM subsystem X controllers associated with ports 1A and 2B. Namespace 2 is hosted by both Array 1 and Array 2, so it is reported to Host 1 through NVM subsystem X controllers associated with ports 1A and 1B and Host 2 and Host 3 through NVM subsystem X controllers associated with ports 1A, 1B, 2A and 2B. Namespace 3 is local to Array 2 and is hosted in NVM subsystem Y, so it is only reported to Host 2 and Host 3 through NVM subsystem Y controllers associated with ports 2A and 2B.

Host 1, Host 2, Host 3 invoke Identify via NVM subsystem X controllers associated with Port 1A or 1B.

Controller or Namespace Structure 02h, "Active Namespace ID List"

| NS_1 |
| --- |
| NS_2 |

Host 2, Host 3 invoke Identify via Subsystem X controllers associated with Port 2A or 2B.

Controller or Namespace Structure 02h, "Active Namespace ID List"

| NS_2 |
| --- |

ANA Groups

With single appliance Array configuration on each side, 2 ANA groups are needed to expose local volumes and additional 14 ANA groups to expose metro volumes with different host connectivity configurations. Also see Table VII above.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of providing access to a nonvolatile memory express (NVMe) namespace via multiple storage arrays, the method comprising:
   providing access to the namespace from a nonvolatile memory (NVM) subsystem while the NVM subsystem is hosted on a first storage array;
   after providing access to the namespace from the NVM subsystem while the NVM subsystem is hosted on the first storage array, performing a stretch operation to concurrently host the NVM subsystem on the first storage array and a second storage array; and
   after performing the stretch operation, providing access to the namespace from the NVM subsystem while the NVM subsystem is concurrently hosted on the first storage array and the second storage array.

2. The method as in claim 1 wherein, prior to performing the stretch operation, the namespace includes a first volume within first storage of the first storage array; and
   wherein performing the stretch operation includes:
      creating a second volume within second storage of the second storage array, and
      synchronizing data from the first volume within the first storage of the first storage array to the second volume within the second storage of the second storage array.

3. The method as in claim 2, further comprising:
   after performing the stretch operation, updating log page information to indicate that the NVM subsystem is concurrently hosted on the first storage array and the second storage array and providing asynchronous event notification to a set of hosts indicating that the log page information has changed.

4. The method as in claim 3 wherein, prior to performing the stretch operation, a first input/output (IO) controller resides on the first storage array to provide the set of hosts with access to the NVM subsystem via the first storage array; and
   wherein the method further comprises:
      after performing the stretch operation, creating a second IO controller on the second storage array to provide the set of hosts with access to the NVM subsystem via the second storage array.

5. The method as in claim 4 wherein providing access to the namespace from the NVM subsystem while the NVM subsystem is concurrently hosted on the first storage array and the second storage array includes:
   reporting availability of the namespace to the set of hosts via the second IO controller created on the second storage array.

6. The method as in claim 5 wherein providing access to the namespace from the NVM subsystem while the NVM subsystem is concurrently hosted on the first storage array and the second storage array further includes:
   accessing the namespace in response to first IO commands via the first IO controller on the first storage array, and
   accessing the namespace in response to second IO commands via the second IO controller on the second storage array.

7. The method as in claim 3, further comprising:
   providing log page information to the set of hosts in response to a set of discovery commands from the set of hosts.

8. The method as in claim 7 wherein providing the log page information includes:
   prior to performing the stretch operation, providing pre-stretch discovery log page information from the first storage array to the set of hosts, the pre-stretch discovery log page information from the first storage array listing the NVM subsystem as being accessible only through a first set of ports of the first storage array.

9. The method as in claim 8 wherein providing the log page information further includes:
   after performing the stretch operation, providing post-stretch discovery log page information from the first storage array to the set of hosts, the post-stretch discovery log page information from the first storage array listing the NVM subsystem as being accessible through the first set of ports of the first storage array and through a second set of ports of the second storage array.

10. The method as in claim 2 wherein providing access to the namespace from the NVM subsystem while the NVM subsystem is concurrently hosted on the first storage array and the second storage array includes:
    maintaining synchronization between the first volume and the second volume.

11. The method as in claim 1, further comprising:
    indicating, on a management interface, that the namespace is a volume that has a "local" state in which the namespace is exposed to a set of hosts from only one storage array, and
    receiving, from the management interface, a configuration command to transition the volume from the "local" state to a "metro" state in which the namespace is then exposed to the set of hosts from multiple storage arrays, the stretch operation being initiated in response to the configuration command.

12. The method as in claim 11, further comprising:
    after performing the stretch operation, updating asymmetric namespace access (ANA) log page information to indicate that the namespace is no longer a member of a first ANA group for "local" state volumes and now a member of a second ANA group for "metro" state volumes.

13. The method as in claim 1, further comprising:
    after providing access to the namespace from the NVM subsystem while the NVM subsystem is hosted on the first storage array and the second storage array, performing a un-stretch operation to no longer host the NVM subsystem on the second storage array.

14. Storage equipment, comprising:
    a first storage array;
    a second storage array;
    the first and second storage arrays being constructed and arranged to perform a method of:
       providing access to a nonvolatile memory express (NVMe) namespace from a nonvolatile memory (NVM) subsystem while the NVM subsystem is hosted on the first storage array,
       after providing access to the namespace from the NVM subsystem while the NVM subsystem is hosted on the first storage array, performing a stretch operation to concurrently host the NVM subsystem on the first storage array and the second storage array, and
       after performing the stretch operation, providing access to the namespace from the NVM subsystem while the NVM subsystem is concurrently hosted on the first storage array and the second storage array.

15. Storage equipment as in claim 14 wherein the method further includes:

prior to performing the stretch operation, providing pre-stretch discovery log page information from the first storage array to a set of hosts, the pre-stretch discovery log page information from the first storage array listing the NVM subsystem as being accessible only through a first set of ports of the first storage array.

16. Storage equipment as in claim 15 wherein the method further includes:

after performing the stretch operation, providing post-stretch discovery log page information from the first storage array to the set of hosts, the post-stretch discovery log page information from the first storage array listing the NVM subsystem as being accessible through the first set of ports of the first storage array and through a second set of ports of the second storage array.

17. A computer program product having a non-transitory computer readable medium which stores a set of instructions to provide access to a nonvolatile memory express (NVMe) namespace via multiple storage arrays; the set of instructions, when carried out by computerized circuitry, causing the computerized circuitry to perform a method of:

providing access to the namespace from a nonvolatile memory (NVM) subsystem while the NVM subsystem is hosted on a first storage array;

after providing access to the namespace from the NVM subsystem while the NVM subsystem is hosted on the first storage array, performing a stretch operation to concurrently host the NVM subsystem on the first storage array and a second storage array; and after performing the stretch operation, providing access to the namespace from the NVM subsystem while the NVM subsystem is concurrently hosted on the first storage array and the second storage array.

\* \* \* \* \*